(12) United States Patent
Chen

(10) Patent No.: US 10,679,809 B2
(45) Date of Patent: Jun. 9, 2020

(54) BATTERY BOX FOR ELECTRONIC CIGARETTE

(71) Applicant: SHENZHEN IVPS TECHNOLOGY CO., LTD., Shenzhen, Guangdong Province (CN)

(72) Inventor: Wen Chen, Shenzhen (CN)

(73) Assignee: SHENZHEN IVPS TECHNOLOGY CO., LTD., Shenzhen (CN)

( * ) Notice: Subject to any disclaimer, the term of this patent is extended or adjusted under 35 U.S.C. 154(b) by 179 days.

(21) Appl. No.: 15/860,653

(22) Filed: Jan. 2, 2018

(65) Prior Publication Data

US 2018/0166238 A1 Jun. 14, 2018

(30) Foreign Application Priority Data

Nov. 4, 2016 (CN) .................. 2016 2 120808 U

(51) Int. Cl.
| | |
|---|---|
| *A24F 13/00* | (2006.01) |
| *A24F 17/00* | (2006.01) |
| *A24F 25/00* | (2006.01) |
| *H01H 36/02* | (2006.01) |
| *A24F 47/00* | (2020.01) |
| *H01M 2/10* | (2006.01) |
| *H01M 10/42* | (2006.01) |

(52) U.S. Cl.
CPC ............. *H01H 36/02* (2013.01); *A24F 47/00* (2013.01); *A24F 47/008* (2013.01); *H01M 2/1022* (2013.01); *H01M 2/1055* (2013.01); *H01M 10/425* (2013.01); *H01H 2221/04* (2013.01); *H01M 2220/30* (2013.01)

(58) Field of Classification Search
CPC .... A24F 47/008; A24F 47/002; H01M 10/44; H01M 10/425; H02J 7/025; H02J 7/027; H02J 7/0052; H01H 36/02
USPC .................................................. 131/329, 328
See application file for complete search history.

(56) References Cited

U.S. PATENT DOCUMENTS

| | | | | |
|---|---|---|---|---|
| 9,414,628 | B2* | 8/2016 | Liu ....................... | A24F 47/008 |
| 10,236,708 | B2* | 3/2019 | Schennum ............. | A24F 47/008 |
| 10,412,994 | B2* | 9/2019 | Schennum ............. | A24F 47/008 |
| 2017/0208865 | A1* | 7/2017 | Nettenstrom ......... | A24F 47/008 |
| 2017/0222468 | A1* | 8/2017 | Schennum ............. | A24F 47/008 |
| 2017/0311646 | A1* | 11/2017 | Liu ....................... | A24F 47/008 |

(Continued)

FOREIGN PATENT DOCUMENTS

| | | |
|---|---|---|
| CN | 104687254 A | 6/2015 |
| CN | 204483024 U | 7/2015 |

(Continued)

*Primary Examiner* — Hae Moon Hyeon
(74) *Attorney, Agent, or Firm* — IP-PAL Patent US; Klaus Michael Schmid

(57) ABSTRACT

The present disclosure provides an electronic cigarette. The electronic cigarette includes a battery box. The battery box includes a support, a Printed Circuit Board (PCB) accommodated in the support, and a button assembly connected to the support. The button assembly includes a first casing, a first magnet arranged in the first casing, and a second magnet abutting against the first magnet. The support defines a limiting hole configured for accommodating the second magnet. The second magnet is connected to the PCB. The electronic cigarette is simple in overall structure and is convenient to carry, and the button has a long service life.

9 Claims, 4 Drawing Sheets

(56) References Cited

U.S. PATENT DOCUMENTS

2018/0013175 A1* 1/2018 Liu .................... H01M 2/1055
2018/0256835 A1* 9/2018 Fornarelli ............. A61M 15/06
2019/0166914 A1* 6/2019 Qiu ....................... A24F 47/008

FOREIGN PATENT DOCUMENTS

| CN | 206040757 U | 3/2017 |
| CN | 206363931 U | 7/2017 |
| CN | 206507317 U | 9/2017 |

* cited by examiner

BATTERY BOX FOR ELECTRONIC CIGARETTE

CROSS REFERENCE TO RELATED APPLICATIONS

The present application claims priority to Chinese Patent Application CN 201621202808.9 filed on Nov. 4, 2016.

TECHNICAL FIELD

The present disclosure relates to an electronic cigarette.

BACKGROUND

Smoking is harmful to health. At present, all countries of the world are vigorously promoting tobacco-free campaigns. Electronic cigarette, also called simulating cigarette, has the same appearance as conventional cigarettes and the similar flavor to conventional cigarettes, even has much more flavors than conventional cigarettes. The electronic cigarette also can create aerosols, flavors and a feeling of smoking, like conventional cigarettes. However, the electronic cigarette has no harmful ingredients such as tar and particulate matter existing in conventional cigarettes, and forms no second hand smoke filling in air. The electronic cigarette can effectively eliminate the harmful substances produced during conventional smoking, and can give a feeling of smell the same as conventional smoking to users. Therefore, the electronic cigarette is mainly used for quitting smoking and substituting conventional cigarettes, and it plays a great role in the promotion of tobacco-free campaigns. Current electronic cigarettes mainly include an atomizer and a battery box. The battery box has a big button thereon. The big button generally is complex in structure and tedious to assemble. The assembly of many parts inside the big button occupies a large space and the electronic cigarette is inconvenient to carry. Moreover, the big button often is stuck, oblique, shaky, etc., resulting in uneven strength or failure of the big button. Consequently, the button has a short service life.

SUMMARY

The present disclosure mainly aims to provide an electronic cigarette, so as to improve the installation flexibility of the button, prolong the service life of the button and make the electronic cigarette convenient to carry.

In order to realize the above aim, the present disclosure provides an electronic cigarette. The electronic cigarette includes a battery box. The battery box includes a support, a Printed Circuit Board (PCB) accommodated in the support, and a button assembly connected to the support.

The button assembly includes a first casing, a first magnet arranged in the first casing, and a second magnet abutting against the first magnet; the support defines a limiting hole configured for accommodating the second magnet; and the second magnet is connected to the PCB.

Preferably, the first casing defines a first groove, and the first magnet is accommodated in the first groove.

Preferably, the button assembly further includes a limiting element configured for accommodating the second magnet, and the limiting element is accommodated in the limiting hole and abuts against the first magnet.

Preferably, the PCB is provided with a contact terminal, and the second magnet abuts against the contact terminal.

Preferably, the battery box further includes an elastic element, and the elastic element has two ends connected to the second magnet and the contact terminal respectively.

Preferably, the elastic element is a silicone element.

Preferably, the button assembly further includes a third magnet connected to the first casing, and the support is provided with a connector configured for accommodating the third magnet.

Preferably, the first casing defines a second groove, and the third magnet and the connector are both accommodated in the second groove.

Preferably, the battery box further includes a housing configured for accommodating the support, the housing is provided with a plurality of locating columns, the support defines a plurality of first through holes, and each locating column is connected to each first through hole through a connecting rod.

Preferably, the electronic cigarette further includes an atomizer connected to the battery box, the atomizer is provided with a connection end, the support defines a second through hole, and the connection end is accommodated in the second through hole.

According to the technical scheme of the present disclosure, the first magnet is arranged in the first casing, the second magnet is arranged on the support, the second magnet has two ends connected to the first magnet and the PCB respectively, in this way, the second magnet not only can control the contact terminal on the PCB as a main button, but also can attract the first casing so that the first casing does not fall off. Therefore, the overall button assembly is simple to assemble, and the service life of the button is prolonged; moreover, the employment of the design that magnets attract each other reduces the size of the battery box, reduces the size of the electronic cigarette and makes the electronic cigarette convenient to carry.

BRIEF DESCRIPTION OF THE DRAWINGS

For a better understanding of the embodiments of the present disclosure or the technical scheme in the prior art, accompanying drawings needed in the description of the embodiments or the prior art are simply illustrated below. Obviously, the accompanying drawings described below are some embodiments of the present disclosure. For the ordinary skill in the field, other accompanying drawings may be obtained according to the structure shown in these accompanying drawings without creative work.

DESCRIPTION OF REFERENCE NUMBERS

Figure 1:
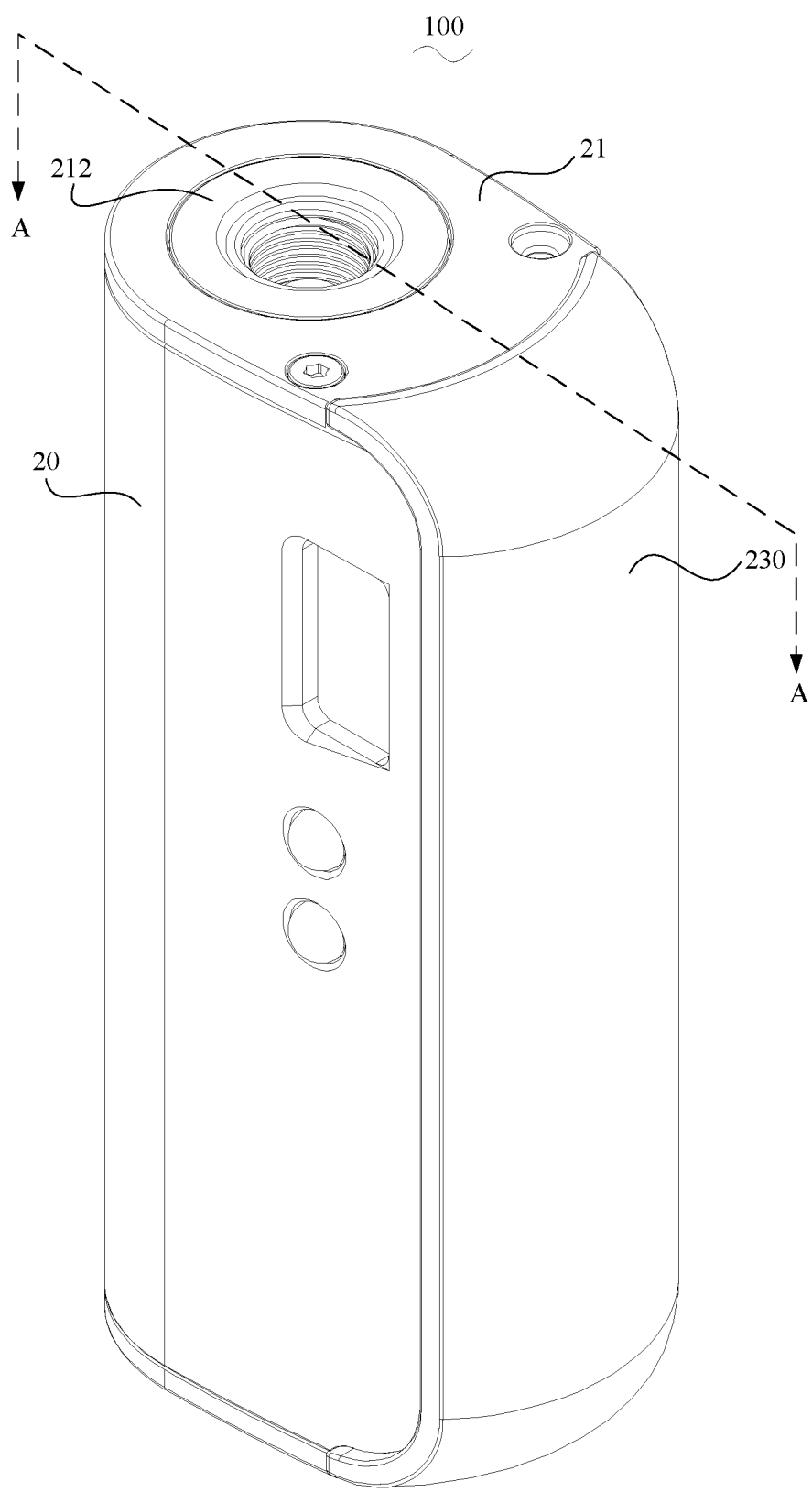
FIG. 1 is a structure diagram of a battery box of an electronic cigarette according to an embodiment of the present disclosure.

| Reference number | Name of part | Reference number | Name of part |
|---|---|---|---|
| 100 | battery box | 23 | button assembly |
| 20 | housing | 230 | first casing |
| 200 | locating column | 2300 | first groove |

-continued

| Reference number | Name of part | Reference number | Name of part |
|---|---|---|---|
| 21 | support | 2301 | second groove |
| 210 | limiting hole | 231 | first magnet |
| 211 | connector | 232 | second magnet |
| 212 | second through hole | 233 | limiting element |
| 213 | first through hole | 234 | third magnet |
| 22 | PCB | 24 | elastic element |
| 220 | contact terminal | 25 | connecting rod |

The implementation of aims, the function features and the advantages of the present disclosure are described below in further detail in conjunction with embodiments with reference to the drawings.

DETAILED DESCRIPTION

A clear and complete description as below is provided for the technical scheme in the embodiments of the present disclosure in conjunction with the drawings in the embodiments of the present disclosure. Obviously, the embodiments described hereinafter are simply part embodiments of the present disclosure, but all the embodiments. All other embodiments obtained by the ordinary skill in the art based on the embodiments in the present disclosure without creative work are intended to be included in the scope of protection of the present disclosure.

It should be noted that all directional indications (such as top, bottom, left, right, front, behind . . . ) in the embodiments of the present disclosure are merely to illustrate a relative position relation, a relative motion condition, etc. between each part in a certain state (for example, the state shown in the drawings). If the state changes, the directional indication changes accordingly.

In the present disclosure, unless otherwise specifically stated and defined, terms "connected", "fixed", etc. should be interpreted expansively. For example, "fixed" may be fixed connection, also may be detachable connection, or integration; may be mechanical connection, also may be electrical connection; may be direct connection, also may be indirect connection through an intermediate, and may be internal communication between two elements or interaction of two elements, unless otherwise specifically defined. The ordinary skill in this field can understand the specific implication of the above terms in the present disclosure according to specific conditions.

In addition, if terms "first", "second", etc. appear in the present disclosure, they are merely for the purpose of description, but cannot be understood as the indication or implication of relative importance or as the implicit indication of the number of the designated technical features; therefore, features defined by "first" and "second" may specifically or implicitly include at least one such feature. In addition, technical schemes of each embodiment of the present disclosure may be combined mutually; however, this must be carried out on the basis that the ordinary skill in this field can implement the combination. When the combination of technical schemes has a conflict or cannot be implemented, it should considered that such combination of technical schemes does not exist and is not in the scope of protection claimed by the present disclosure.

The present disclosure provides an electronic cigarette. The electronic cigarette includes an atomizer, and a battery box 100 connected to the atomizer.

Figure 2:
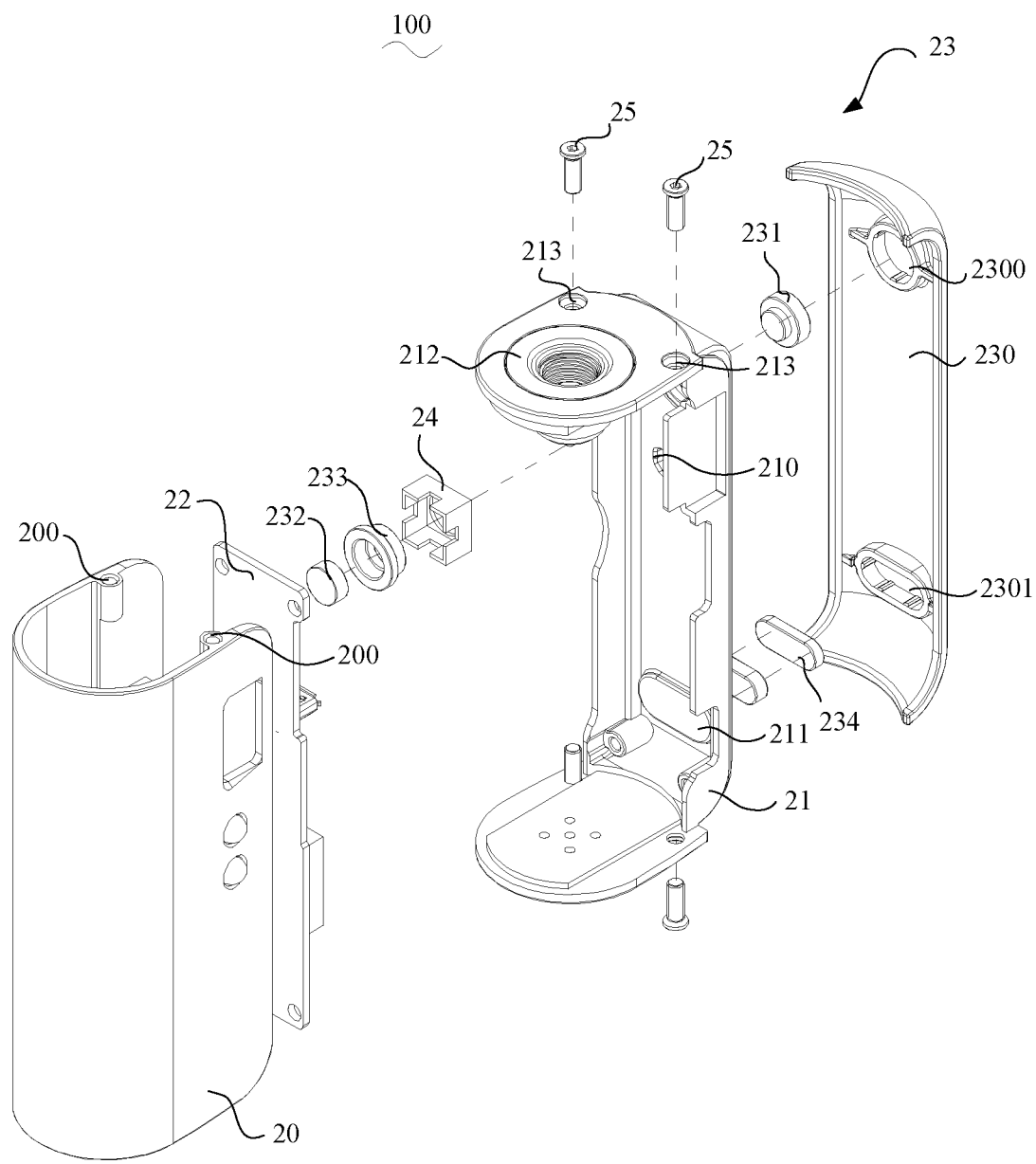
FIG. 2 is an exploded view of the battery box shown in FIG. 1.

Referring to FIG. 1 and FIG. 2, in an embodiment of the present disclosure, the battery box 100 of the electronic cigarette includes a housing 20, a support 21 partially accommodated in the housing 20, a PCB 22 accommodated in the support 21, and a button assembly 23 connected to the support 21. The button assembly 23 includes a first casing 230, a first magnet 231 connected to the first casing 230, and a second magnet 232 abutting against the first magnet 231. The support 21 defines a limiting hole 210 configured for accommodating the second magnet 232. The second magnet 232 is connected to the PCB 22. The first casing 230 is matched with and connected to the housing 20.

Specifically, the battery box 100 is internally provided with a battery (not shown in the drawings) configured for supplying power to the PCB 22. The support 21 is fabricated by an aluminum alloy/zinc alloy plating process to realize electrical communication between the PCB 22 and the atomizer. The battery box 100 is configured for supplying electrical power to the atomizer (not shown in the drawings). The PCB 22 has two ends connected to the support 21 respectively. In order to make the PCB more stabilized, the support 21 can define a clamping groove, so that the PCB 22 is fixed on the support 21 by clamping, or, the PCB 22 can be stably connected to the support 21 through a bolt. The support 21 defines a limiting hole 210. The limiting hole 210 directly faces the first magnet 231. The second magnet 232 is accommodated in the limiting hole 210 and is in tight connection with the first magnet 231. The first magnet 231 and the second magnet 232 have opposite poles on the two surfaces where they are connected, so as to realize tight connection. The other surface of the second magnet 232 is connected to the PCB 22. The PCB 22 is provided with a contact terminal 220 (that is, start switch). The second magnet 232 abuts against the contact terminal 220. The working principle of the battery box 100 is as follows. When the first casing 230 is pressed by an external force, the second magnet 232 triggers the contact terminal 220 on the PCB 22 to start ignition, under the action of the external force; when the first casing 230 is released, the second magnet 232 shuts down ignition under the resilience force of the contact terminal 220.

The battery box 100 of the electronic cigarette of the present disclosure employs the principle that magnets attract each other. The first magnet 231 is arranged inside the first casing 230. The first casing 230 is in tight connection with the support 21 through the second magnet 232 on the support 21. The battery box 100 is simple in overall structure. The limiting hole 210 can facilitate accurate alignment when the first casing 230 is pressed to trigger the switch on the PCB 22. The size of the battery box is reduced and the electric cigarette is convenient to carry.

Referring to FIG. 2, in order to prevent the first magnet 231 swinging randomly inside the first casing 230 and to prolong the service life of the button, the first casing 230 defines a first groove 2300, and the first magnet 231 is accommodated in the first groove 2300.

Further, in order to enable the first casing 230 to tightly fit the support 21, the button assembly 23 further includes a third magnet 234 connected to the first casing 230, and the support 21 is provided with a connector 211 configured for accommodating the third magnet 231. In order to enable the third magnet 231 to be in firmer connection with the first casing 230, the first casing 230 defines a second groove 2301, and the third magnet 231 and the connector 211 are both accommodated in the second groove 2301.

Further, the button assembly 23 includes a limiting element 233 configured for accommodating the second magnet 232, the limiting element 233 is accommodated in the limiting hole 210 and abuts against the first magnet 231. The second magnet 232 is accommodated in the limiting element 233 so as to facilitate ease of connecting the second magnet 232 to the support 21. Moreover, the limiting element 233 abuts against the first magnet 231, enhancing the stability of the connection of the first magnet 231 and the second magnet 232.

Figure 3:
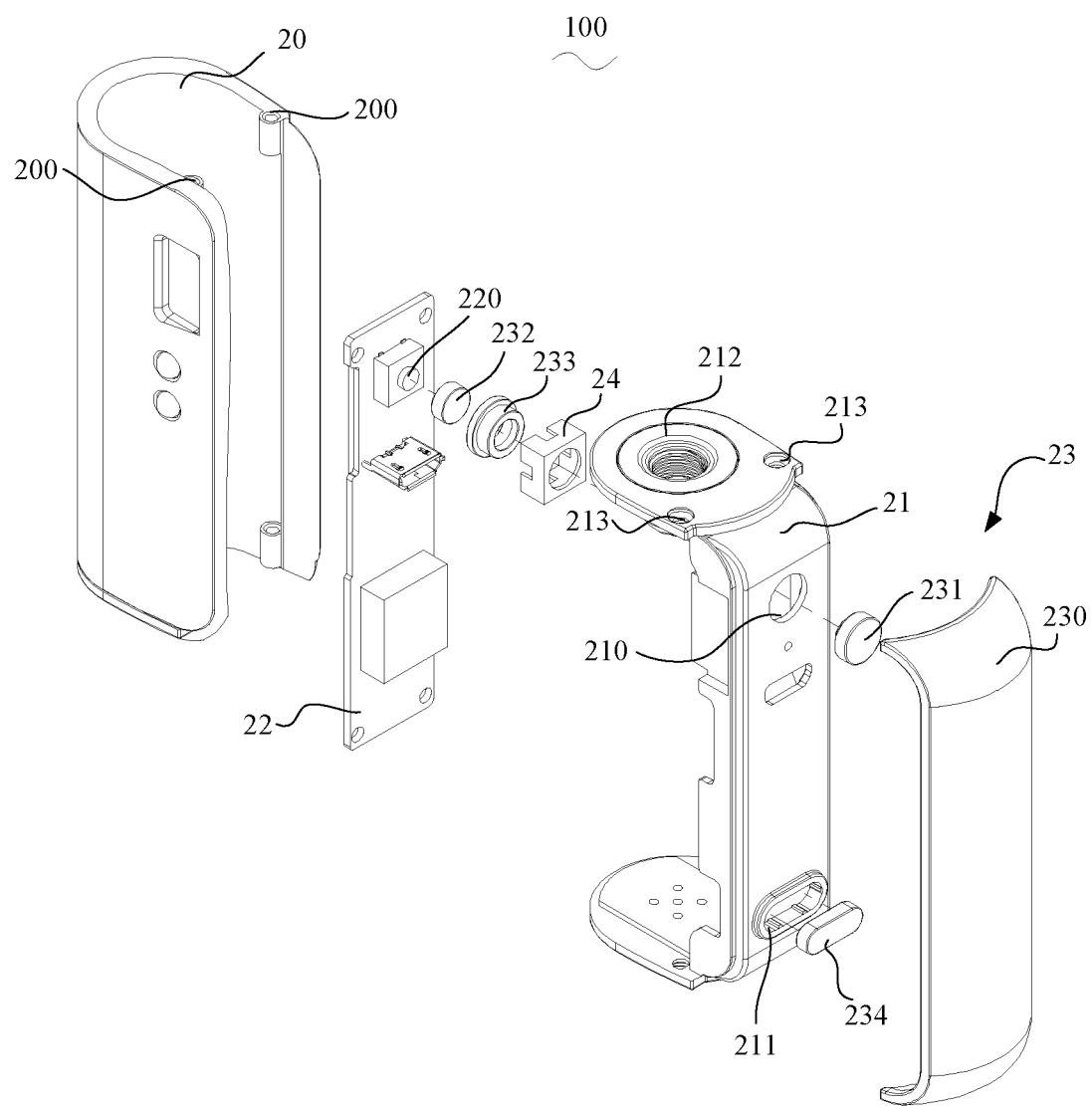
FIG. 3 is another exploded view of the battery box shown in FIG. 1.
Figure 4:
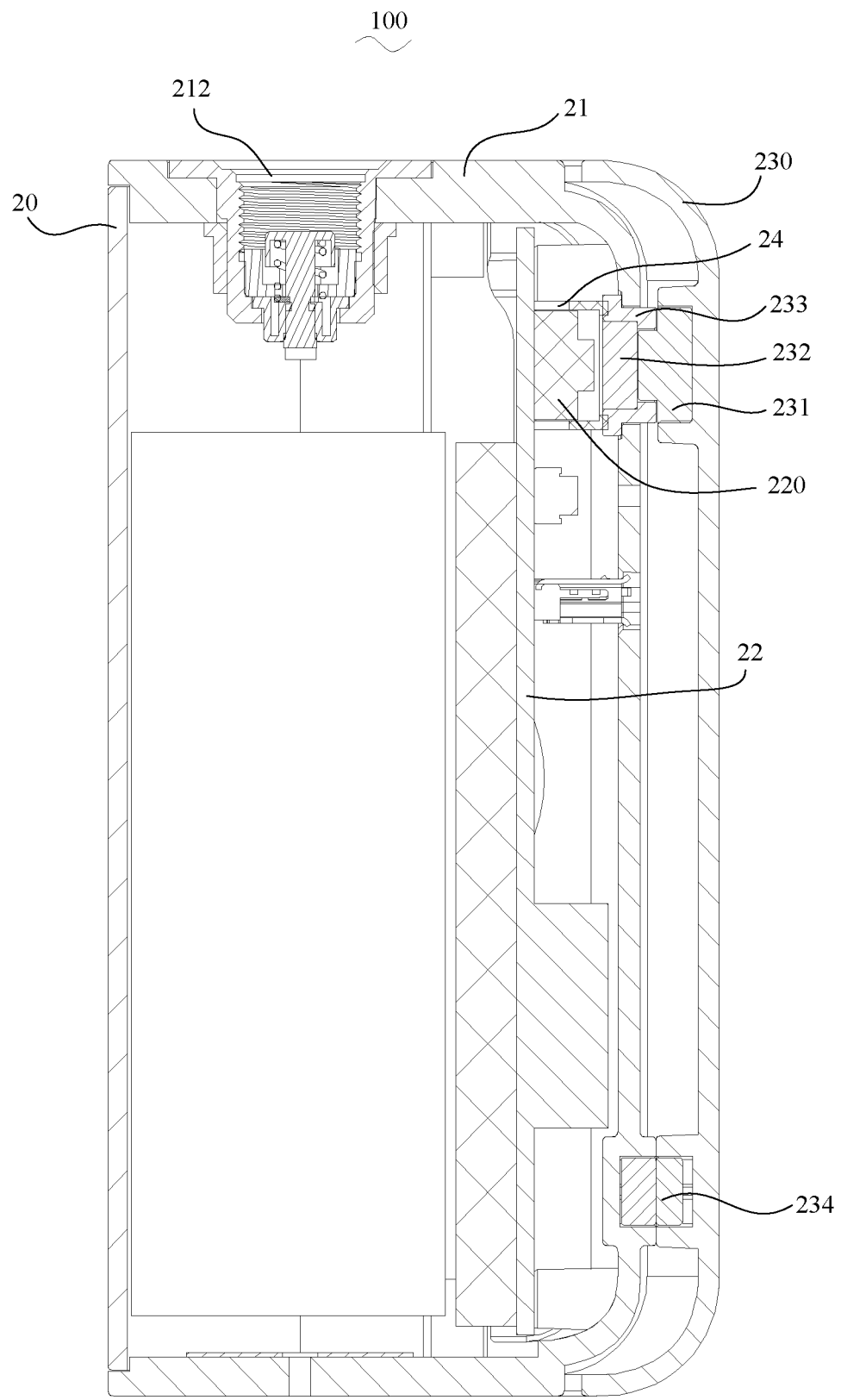
FIG. 4 is a cross-sectional view of the battery box along line A-A shown in FIG. 1.

Further, referring to FIG. 3 and FIG. 4, in order to prevent stuck key and improve hand feeling, the battery box 100 further includes an elastic element 24, and the elastic element 24 has two ends connected to the second magnet 232 and the contact terminal 220 respectively. The elastic element 24 is a silicone element. When the first casing 230 is pressed, the second magnet 232 presses against the elastic element 24, the elastic element 24 deforms and triggers the contact terminal 220 on the PCB 22 to start ignition. When the first casing 230 is released, the second magnet 232 disengages from the contact terminal 220 to shut down ignition, under the action of the resilience force of the elastic element 24 and the contact terminal 220.

Further, in order to detach and assemble the battery box 100 conveniently, the housing 20 is provided with a plurality of locating columns 200, the support 21 defines a plurality of first through holes 213, and each locating column 200 is connected to each first through hole 213 via a connecting rod 25.

Further, in order to detach and assemble the battery box 100 from and on the atomizer conveniently, the support 21 defines a second through hole 212, the atomizer is provided with a connection end, and the connection end is accommodated in the second through hole 212.

The battery box of the electronic cigarette of the present disclosure employs the principle that magnets attract each other. The second magnet not only can control the start switch on the PCB as a main button, but also can attract the first casing so as to be in tight connection with the first casing. The overall structure is detachable. Since the structure of the battery box is simple and the size of the battery box can be greatly reduced, the electronic cigarette has a smaller size and is more convenient to carry. Grooves and holes are designed inside the button to prevent left-right swinging of the button, thereby prolonging the service life of the button. The elastic element is arranged between the contact terminal and the second magnet and thus enhances the hand feeling of the button.

The above are preferred embodiments of the present disclosure merely and are not intended to limit the patent scope of the present disclosure. Any equivalent structures made according to the description and the accompanying drawings of the present disclosure without departing from the idea of the present disclosure, or any equivalent structures applied in other relevant technical fields directly or indirectly are intended to be included in the patent protection scope of the present disclosure.

What is claimed is:

1. A battery box for an electronic cigarette, wherein the battery box comprises a support, a PCB accommodated in the support, and a button assembly connected to the support, wherein the PCB is provided with a start switch;
   wherein the button assembly comprises a first casing, a first magnet arranged in the first casing, and a second magnet abutting against the first magnet; wherein the support defines a limiting hole configured for accommodating the second magnet; and the second magnet is connected to the PCB such that the second magnet abuts against the start switch.

2. The battery box according to claim 1, wherein the first casing defines a first groove, and the first magnet is accommodated in the first groove.

3. The battery box according to claim 2, wherein the button assembly further comprises a third magnet connected to the first casing, and the support is provided with a connector configured for accommodating the third magnet.

4. The battery box according to claim 3, wherein the first casing defines a second groove, the third magnet and the connector are both accommodated in the second groove.

5. The battery box according to claim 3, wherein the battery box further comprises a housing configured for accommodating the support, the housing is provided with a plurality of locating columns, the support defines a plurality of first through holes, and each locating column is connected to each first through hole through a connecting rod.

6. The battery box according to claim 1, wherein the button assembly further comprises a limiting element configured for accommodating the second magnet, the limiting element is accommodated in the limiting hole and abuts against the first magnet.

7. The battery box according to claim 1, wherein the PCB is provided with a contact terminal, and the second magnet abuts against the contact terminal.

8. The battery box according to claim 7, wherein the battery box further comprises an elastic element, and the elastic element has two ends connected to the second magnet and the contact terminal respectively.

9. The battery box according to claim 8, wherein the elastic element is a silicone element.

* * * * *